KEYBOARD CONTROL AND ACTUATING APPARATUS

Filed Jan. 26, 1960 3 Sheets-Sheet 1

INVENTORS
WILLIAM P. RYAN
RALPH L. PARKER
BY Thomas S. Rose
Albert W. Scribner
ATTORNEYS

KEYBOARD CONTROL AND ACTUATING APPARATUS

INVENTORS
WILLIAM P. RYAN
RALPH L. PARKER
BY Thomas S. Ross
Albert W. Scribner
ATTORNEYS

KEYBOARD CONTROL AND ACTUATING APPARATUS

Filed Jan. 26, 1960 3 Sheets-Sheet 3

INVENTORS
WILLIAM P. RYAN
RALPH L. PARKER
BY Thomas S. Ross
Albert W. Scribner
ATTORNEYS

United States Patent Office 3,038,577

Patented June 12, 1962

3,038,577

KEYBOARD CONTROL AND ACTUATING APPARATUS

William P. Ryan, Avon, and Ralph L. Parker, Ellington, Conn., assignors to Royal McBee Corporation, Port Chester, N.Y., a corporation of New York Filed Jan. 26, 1960, Ser. No. 4,749

11 Claims. (Cl. 197—16)

This invention relates to an improved keyboard encoder and more particularly relates to a novel arrangement for a keyboard operated encoding device and a power drive means therefor for selectively actuating a plurality of individual output members. Although the present invention has particular application to matrix type printers and will be described in connection therewith, it will be understood that the instant apparatus may be used for other purposes such as a remote control for typewriters or a tape punch, or as a computer input device.

In matrix printers the printing head is in most cases supported so as to have two degrees of freedom and is coordinately displaced to successive printing positions by manual or power operated means. Where such coordinate movement of the printing head occurs in response to the depression of a single key an encoding system of some sort must be utilized to convert the information represented by depression of the single key into two coordinate quantities representative of the displacement necessary to bring a desired type to an operative printing position. In such an operation the key action, the encoding operation, and the coordinate indexing of the printing head must be completed before a printing stroke may occur and hence it is imperative that these three functions be efficiently carried out in a minimum of time and with relatively low inertia forces involved.

One object of the instant invention is to provide an efficient and relatively inexpensive keyboard encoding and power operating arrangement whereby a very light keyboard touch is obtained.

Another object of the invention is to provide an improved keyboard encoding and power drive mechanism for selectively actuating coded combinations of a plurality of output members whereby a minimum number of relatively small lightweight parts are used.

Another object of the invention is to provide a novel keyboard encoding apparatus whereby the depression of a key lever causes the selective engagement of one or more of a plurality of movably mounted dogs with a power operated member so as to power actuate a coded group of individual output elements that correspond to the key depressed.

Another object of the invention is to provide a novel keyboard encoding device whereby a plurality of bails are adapted to be selectively connected to a power operating member in response to the selective sequential depression of the key levers of the machine.

Another object of the invention is to provide an improved encoding and power operating means for a matrix type printer or the like whereby a power roll is employed to drive one bail or selected groups of bails which action serves to differentially position a coded number of output elements.

Another object of the invention is to provide a novel keyboard encoding device for a matrix type printer wherein each key lever is provided with a coded number of longitudinally rigid but laterally flexible depending projections which in operation serve to couple one or more bails to a power driven member so as to enable said member to actuate the matrix printing head through the power displacement of said bails.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
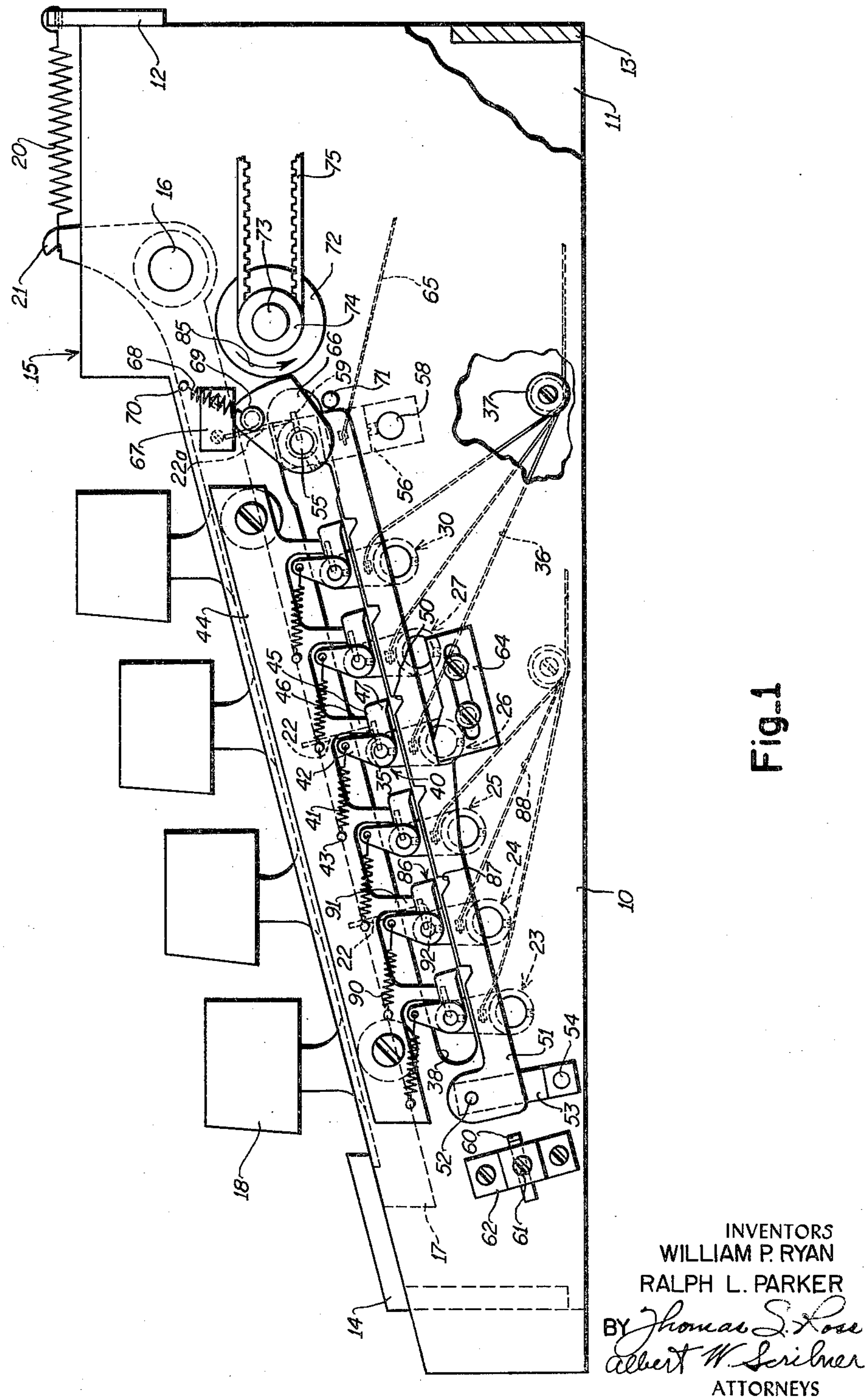
FIGURE 1 is a side elevational view illustrating the power drive and encoding apparatus.
Figures 2, 6:
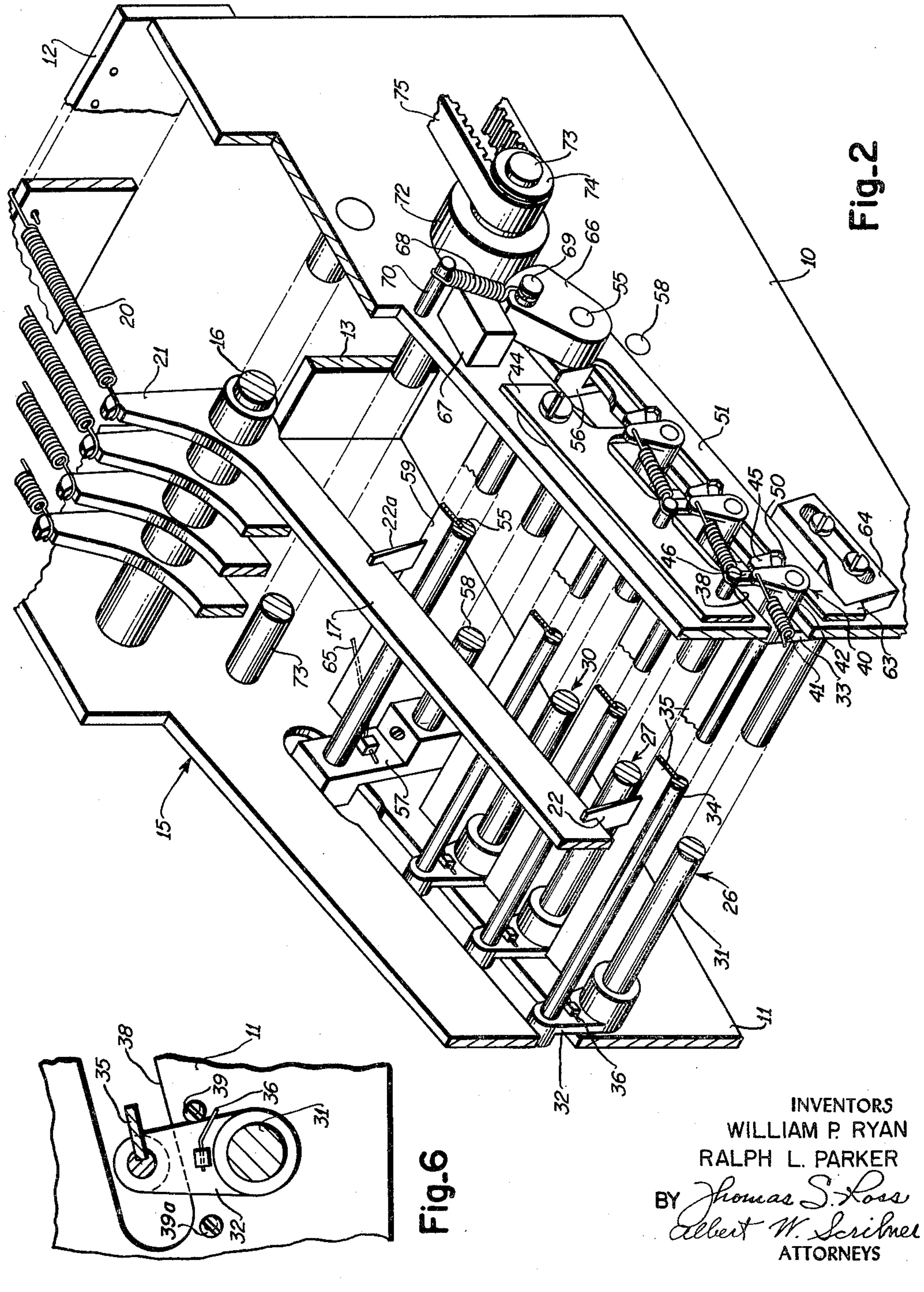
FIGURE 2 is a fragmentary perspective view illustrating the apparatus of FIGURE 1.
FIGURE 6 is a fragmentary partial vertical sectional view showing the forward and rearward stop arrangement for one of the bail assemblies.

Referring to FIGURES 1 and 2 there is shown a pair of vertically disposed parallel side plates 10 and 11 which are connected together in mutually fixed relation by means of cross members 12, 13 and 14. The side plates and cross members cooperatively form the frame 15 which operatively supports the various linkages associated with the keyboard and the power drive mechanism of the instant matrix type printer. A cross shaft 16 is mounted in and between said side frames and has a normal complement of key levers pivotally mounted thereon. For the sake of clarity a description of the construction and operation of only one key lever will be made here, it being understood that the remaining key levers are constructed and operated in a similar manner. Key lever 17 is provided with a key 18 and is biased in a clockwise direction, as seen in FIGURES 1 and 2, by means of a spring 20 that is operatively secured between the inner lever end 21 and the cross member 12. The normal position of key lever 17 is determined by engagement of the outer end of the latter with the lower edge of the cross member 14 as illustrated in FIGURE 1. Each key lever is provided with a coded number of longitudinally rigid but laterally yieldable depending fingers 22 the purposes of which will be subsequently described.

Six bail assemblies 23, 24, 25, 26, 27 and 30 are mounted in the forward portion of frame 15 and in that said bail assemblies are each similar in construction and operation only one need be discussed in detail here. The bail assembly 26 comprises a cross shaft 31, FIGURE 2, which is rotatably mounted in and between said side plates 10 and 11 and which has rotatably fixed thereto a pair of spaced radially extending bail arms 32 and 33. Rotatably mounted in and between the outer ends of said bail arms is a shaft 34 to which is fixed a rearwardly extending shelf 35. A flexible cable 36, FIGURE 6, secured to the bail arm 32 extends over a suitable pulley 37 rotatably mounted on side plate 11 and rearwardly to a code translating device (not shown) which in turn controls the coordinate displacement of the matrix printing head. The cable 36 is normally yieldably tensioned by said translating device so as to bias bail assembly 26 in a clockwise direction to a home position determined by engagement of the bail arm 32 with the eccentric stop 39 which is rotatably adjustably secured to the inner side of the side plate 11 by any suitable means. The counter clockwise limit of travel of the bail assembly is determined by engagement of said bail arm 32 with a similar eccentric stop 39*a*, FIGURE 6, that is also rotatably adjustably secured to the inner side of the side plate 11 by any suitable means. The right hand end of bail shaft 34, as seen in FIGURE 2, extends through an elongated slot 38 formed in the side plate 10 and has a clutch dog 40 rotatably fixed thereto. A tension spring 41 is operatively secured between the upwardly extending leg 42 of said dog and a stud 43 fixed to a stud plate 44 that is bolted to the outer side of said side plate 10. The normal counter clockwise rotative position of dog 40 is determined by engagement of the upper edge of a leg 45 of said dog with the lower end of a depending projection 46 integrally formed on the adjacent portion of said stud plate 44, as illustrated in FIGURE 1. A nose 47, FIGURE 1, formed at the lower rearward edge of said dog leg 45 is adapted to cooperate with a notch 50 formed in a link 51. As will be evident from FIGURE 1 each clutch dog of the respective bail assemblies 23, 24, 25, 27 and 30 and corresponding to dog 40 is disposed adjacent to and is operatively associated with a link notch corresponding to said notch 50. The forward end of link 51 is articulately connected by a pin 52 to the outer or free end of a crank arm 53 that is pivotally mounted on the side plate 10 by means of a suitable stud 54. The rearward end of link 51 is pivotally connected to a cross shaft 55 that extends through said side plate slot 38 and is rotatably mounted by the free or outer ends of bail arms 56, 57; the latter being secured to a cross shaft 58 which is rotatably mounted in the frame side plates. A rearwardly extending shelf 59 is fixedly secured to the rearward side of the cross shaft 55 and underlies a depending longitudinally rigid but laterally yieldable finger 22*a* fixed to said key lever 17.

The forward swinging movement of the four-bar linkage defined by elements 53, 51, 56 is limited by engagement of the forward end of link 51 with a stop 60 which is longitudinally adjustably mounted on the side plate 10 by any suitable means such as a bracket 62 and a set screw 61. The rearward swinging movement of the four bar linkage is limited by engagement of a central depending projection 63, FIGURE 2, of link 51 with a stop 64 which is longitudinally adjustably mounted on said side plate 10 by any suitable means.

A flexible cable 65 is secured to the bail arm 57 and extends rearwardly to a clutch control mechanism not shown and is normally spring loaded in tension. On the right hand end, FIGURE 2, of cross shaft 55 there is rotatably fixed a main drive pawl 66 which is normally rotatably biased into engagement with a fixed side plate stop 67 by means of a spring 68 that is operatively secured between the pawl stud 69 and the side plate stud 70. This spring bias action also helps to normally maintain the lower projection 63 on link 51 in engagement with said stop 64. The clockwise limit of travel of pawl 66 is determined by a stud 71, FIGURE 1, fixed on the side plate 10. The eccentric periphery of pawl 66 is adapted to frictionally cooperate with the periphery of a rubber power roll or cylinder 72 which is secured to a cross shaft 73 rotatably mounted in the frame side plates 10 and 11. To the right hand end, FIGURE 2, of shaft 73 there is fixed a pulley 74 which is rotatably driven in a counter clockwise direction, FIGURE 2, by means of a belt 75 from a motor not shown.

Each of the key levers of the instant apparatus is provided with a depending finger, similar to 22*a*, for initiating a power operation of the link 51 from power roll 72, and in addition is provided with a coded number of one or more depending fingers such as 22 which simultaneously cooperate with one or more of the respectively associated bail assemblies 23, 24, 25, 26, 27 and 30.

Figure 5:
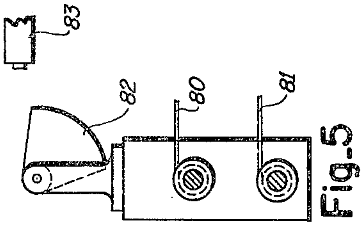
FIGURE 5 is a side elevational view of a typical matrix type printing head and hammer.

Through translating means not shown the three bail assemblies 23, 24 and 25 and the associated cables, such as 36, serve to control the differential actuation of the coordinate printing head control cable 80, FIGURE 5, while the cables associated with bail assemblies 26, 27 and 30 serve to control the differential actuation of the other coordinate printing head control cable 81. When the various cables 36 etc., are selectively power driven in the manner above described their combined actions serve to simultaneously actuate cables 80 and 81 so as to sequentially index the spherical printing head 82 about horizontal and vertical axes and thereby index said head for printing cooperation with the movable printing hammer 83.

Figure 3:
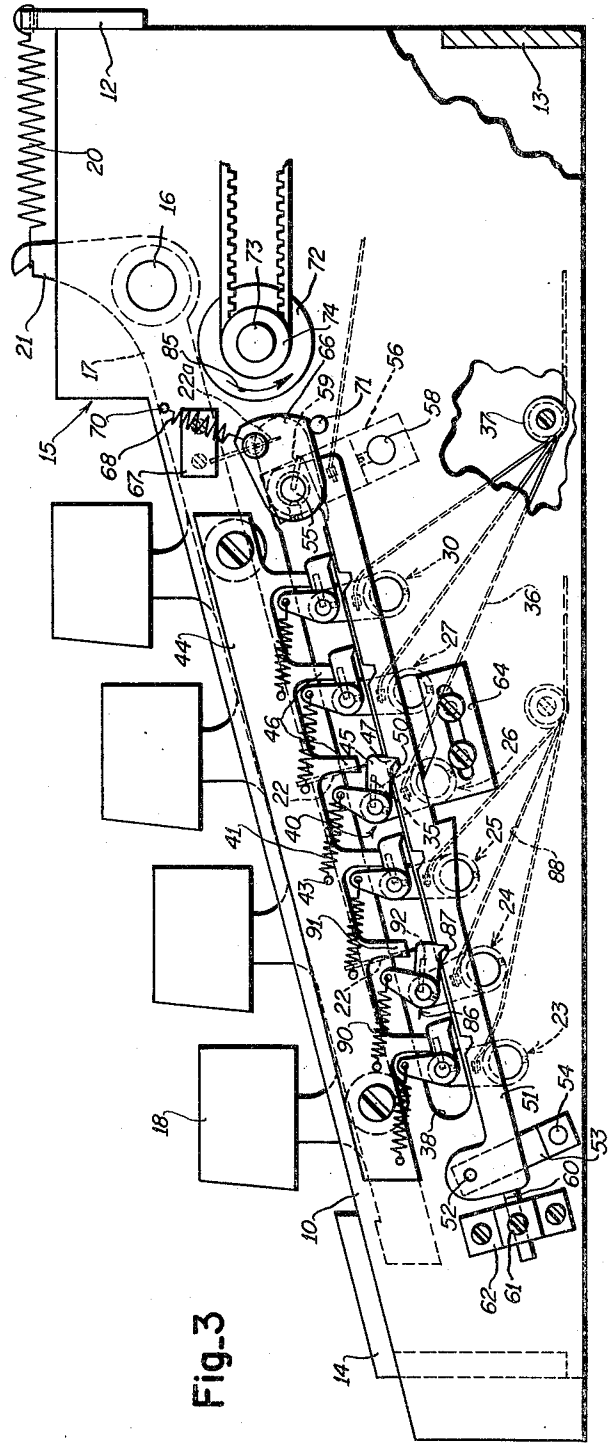
FIGURES 3 and 4 are active views of the apparatus of FIGURE 1.

In operation the power roll 72 is continuously driven in the direction indicated by arrow 85, FIGURE 1. When the key lever 17 is depressed the depending fingers 22 will engage and rotatably displace the rearward extending shelves of the bail assemblies 24 and 26 so that the dogs 40 and 86 will be respectively swung into the notches 50 and 87 of link 51. The length of the depending finger 22*a* on key lever 17 is adjusted so that immediately after said dogs have been swung into operative engagement with the notches 50 and 87 the lower end of said finger 22*a* will engage shelf 59 and swing the latter in a clockwise direction, FIGURE 1 so as to pivot the drive pawl 66 into operative engagement with the periphery of the rotating power roll 72. Thereafter due to the usual eccentric peripheral contour of the pawl 66 the rolling frictional engagement of the latter with the power roll will serve to power drive the link 51 in a forward direction until the left end of said link engages stop 60 as illustrated in FIGURE 3. During this action the bail assemblies 24 and 26 will be rotatably actuated and the associated cables 88 and 36 will be thereby pulled so as to control the indexing of the printing head 82 through cables 80 and 81 and the said translating mechanism of the machine. The terminal portion of the operative forward travel of link 51 is effected by the inertial forces of the moving parts, the pawl 66 having moved out of engagement with the power roll 72 so as to momentarily ride along the top of stud 71 and to rebound toward stop 67. When the link 51 is arrested by stop 60, the bail assemblies 24 and 26 will continue their counter clockwise motion by inertia until arrested by the stops corresponding to stop 39*a* of FIGURE 6. During this terminal inertial portion of the arcuate travel of the bail assemblies the noses of the engaged dogs 40 and 86 will slide up the inclined forward edges of the notches 50 and 87 respectively of the now arrested link 51 so as to cam said dogs out of operative engagement with said link. As the link 51 commences its rearward travel under the action of the tension in cable 65 and spring 68 (assisted by additional springs if desired) the pawl 66 will be immediately swung in a counter clockwise direction into engagement with the lower edge of said stop 67. As link 51 partakes of its rearward travel said springs 90 and 41 will hold the dogs 86 and 40 in their respective disengaged counter clockwise positions in engagement with the respective lower edges of the depending projections 91 and 46 formed on said stud plate 44.

Figure 4:
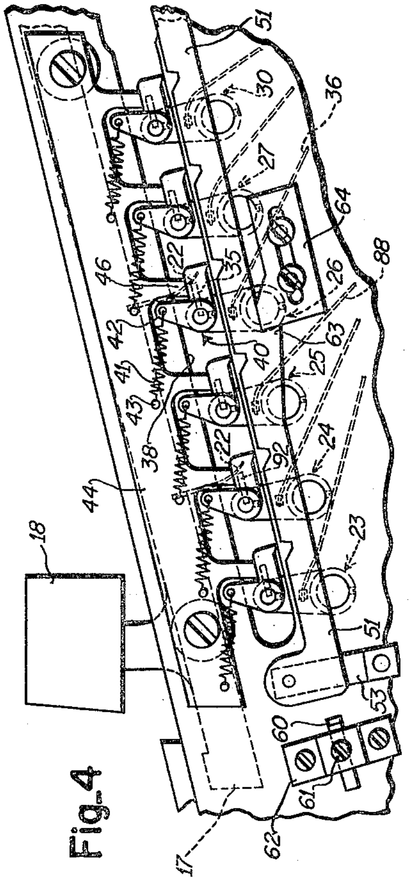

If, when the link 51 finally reaches its normal rearward position, the key lever 17 has been released and is in its normal elevated FIGURE 1 position, then the said shelves 92, 35 and 59 will move into underlying relation with respect to their associated depending laterally flexible fingers 22 and 22*a*. If however the key lever has not been so released then the rearwardly moving shelves 92, 35 and 59 will engage and rearwardly flex the lower portions of said fingers 22 and 22*a*, as illustrated in FIGURE 4, thereby preventing the initiation of another printing cycle of the apparatus. In this manner only a single printing action is obtained for each depression of a key lever regardless of how long the key lever is held in its depressed condition. When key lever 17 is released from the FIGURE 4 position and moves to its normal elevated FIGURE 1 position, the flexed fingers 22 and 22*a* will ride up and over the rearward edges of their respective shelves so as to assume the positions shown in FIGURE 1 preparatory for a subsequent operative depression of the key 18. It will be understood that depression of the various other key levers will effect a corresponding actuation of other coded numbers of said bail assemblies 23, 24, 25, 26, 27 and/or 30.

As will be apparent if more type is added to the printing head so as to enable the typing of a corresponding greater number of different characters, additional keys and bail assemblies similar to those above described may be provided. Where the printing head of the matrix typewriter is provided with both upper and lower case type for each letter, an output cable is attached directly to the case shift key so that depression of this key serves to pull the connected cable forwardly. The rearward ends of the 6 cables 36, 65, 88 etc., and the shift key cable then cooperatively control the operation of said translating means and said cables 81 and 82.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. In a keyboard encoding apparatus, a frame, a plurality of key levers movably mounted on said frame, a plurality of bail assemblies movably mounted in said frame, a power roll rotatably mounted in said frame and adapted to be continuously driven, cam drive means connectable with said key levers and movable into direct frictional engagement with said power roll by operation of any one of said key levers, and means for coupling different coded numbers of said bail assemblies to said drive means upon operation of different ones of said key levers.

2. In a keyboard control apparatus; a frame, a plurality of key levers movably mounted in said frame, a plurality of laterally flexible fingers secured to said key levers, a plurality of bail assemblies movably mounted in said frame, each of said bail assemblies having a movable shelf extending laterally of said key levers and being adapted to be operated by depression of any one of several of said key levers through the respectively associated fingers on the depressed key levers, a single power driven member adapted to actuate said bail assemblies, and means operated by said bail assembly shelves for selectively coupling said bail assemblies to said driven member.

3. In a keyboard encoder for a business machine; a frame, a plurality of key levers pivotally mounted in said frame, a plurality of bail assemblies movably mounted in said frame, power drive means adapted to actuate said bail assemblies, each of said key levers having a coded number of depending fingers which when said key levers are depressed serve to displace a portion of the associated bail assemblies into coupling engagement with said power drive means whereby said coupled bail assemblies are actuated through operative strokes, and connecting means secured to each of said bail assemblies and operative to control the displacement of the control elements of the machine.

4. In a keyboard encoding device; a frame, a plurality of key levers pivotally mounted on said frame, a plurality of longitudinally rigid but laterally flexible projections on each of said key levers, a plurality of bail assemblies pivotally mounted in said frame, a dog pivotally mounted on each of said assemblies, power drive means mounted on said frame, and means on each of said bail assemblies adapted to be operated by the projections on several of said key levers so as to pivot the respectively associated dogs into operative engagement with said drive means.

5. In a keyboard encoding device; a frame, a plurality of key levers movably mounted in said frame, each lever having at least one depending projection thereon, at least one bail assembly pivotally mounted in said frame, said assembly including a shaft, a pair of arms secured to said shaft, a shelf pivotally mounted between said bail arms and adapted to underlie said projection, a coupling member operatively connected to said shelf, a power driven operating means, said shelf being pivotally actuated by depression of said key lever and associated projection whereby said coupling member is moved into operative engagement with said power driven operating means, and connecting means secured to said bail assembly for operating one of the control elements of the external apparatus to be controlled.

6. Apparatus as defined by claim 5 wherein said projection is longitudinally rigid but laterally flexible.

7. In a keyboard control and actuating device; a frame, a plurality of key levers movably mounted on said frame, each of said key levers having a coded number of depending laterally flexible fingers, a plurality of bail assemblies movably mounted in said frame, a power roll rotatably mounted in said frame, an operating link adapted to be actuated by said power roll, means responsive to the depression of a key lever and at least one of its depending fingers for operatively coupling at least one of said bail assemblies to said operating link, and means responsive to the depression of said key lever through another of its depending fingers for enabling the operative engagement of said operating link and said power roll at a time after the said operative coupling of said bail assembly and link.

8. In a keyboard encoding device; a frame, a plurality of key levers pivotally mounted on said frame, at least one depending rearwardly flexible finger secured to each key lever, a plurality of bail assemblies pivotally mounted in said frame, each of said assemblies including a cross shaft, a pair of bail arms secured to said shaft, a shelf pivotally supported by said arms and adapted to underlie one of said fingers, a dog rotatably secured to one end of said shelf, an operating link translatably mounted in said frame, said link having a plurality of spaced notches formed therein which are respectively associated with said dogs, said finger in response to the depression of the associated key lever being adapted to rotatably operate the underlying shelf so as to pivot the related dog into operative engagement with the associated notch in said link, a power roll rotatably mounted in said frame, and means responsive to the operation of said associated key lever for operatively engaging said link and power roll at a time after the operative engagement of said dog and associated notch whereby said link and the coupled bail assembly are actuated through an operative cycle.

9. Apparatus as defined by claim 8 wherein said link notches and related bail assemblies are constructed and arranged so that when said link reaches the end of its power stroke the actuated bail assemblies may continue their arcuate motion by inertia and thereby cam the associated dogs out of engagement with the related link notches.

10. A drive action for a business machine; comprising a frame, a power roll rotatably mounted in said frame, a linkage adapted to be driven by said power roll, said linkage having a movable power roll engaging member, a key operated linkage adapted to control the movement of said member into operation engagement with said power roll, said key operated linkage having a cantilevered springlike flexible finger thereon which is substantially rigid in one plane and flexible in a different plane, said finger being arranged so that the rigidity thereof in said one plane serves to transmit a triggering movement from said key operated linkage to cause said member to engage said power roll while the flexibility of said finger serves to permit a by-pass action when said key operated linkage is held in the depressed condition, and a bail mechanism connected to said first linkage and including an element engageable by said finger upon key operation thereof to cause said triggering movement.

11. Apparatus as defined by claim 10 wherein the said finger transfers said triggering movement by a column action and is flexible in a plane which is substantially coincident with the movement of said key operated linkage.

References Cited in the file of this patent

UNITED STATES PATENTS

| | | |
|---|---|---|
| 1,602,756 | Dorsey | Oct. 12, 1926 |
| 1,781,720 | Degener | Nov. 18, 1930 |
| 2,275,615 | Doty | Mar. 10, 1942 |
| 2,661,683 | Beattie | Dec. 8, 1953 |
| 2,848,089 | Smathers | Aug. 19, 1958 |
| 2,879,876 | Palmer et al. | Mar. 31, 1959 |
| 2,905,302 | Hickerson | Sept. 22, 1959 |
| 2,919,002 | Palmer | Dec. 29, 1959 |